Figure 5:
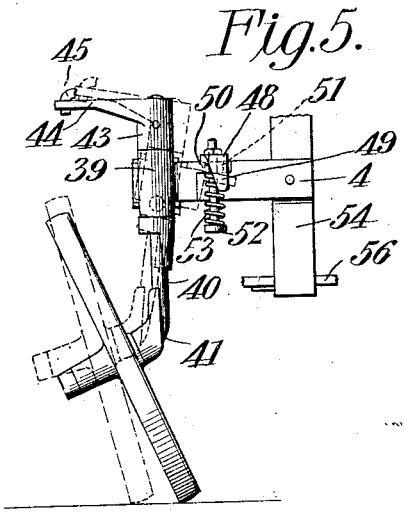

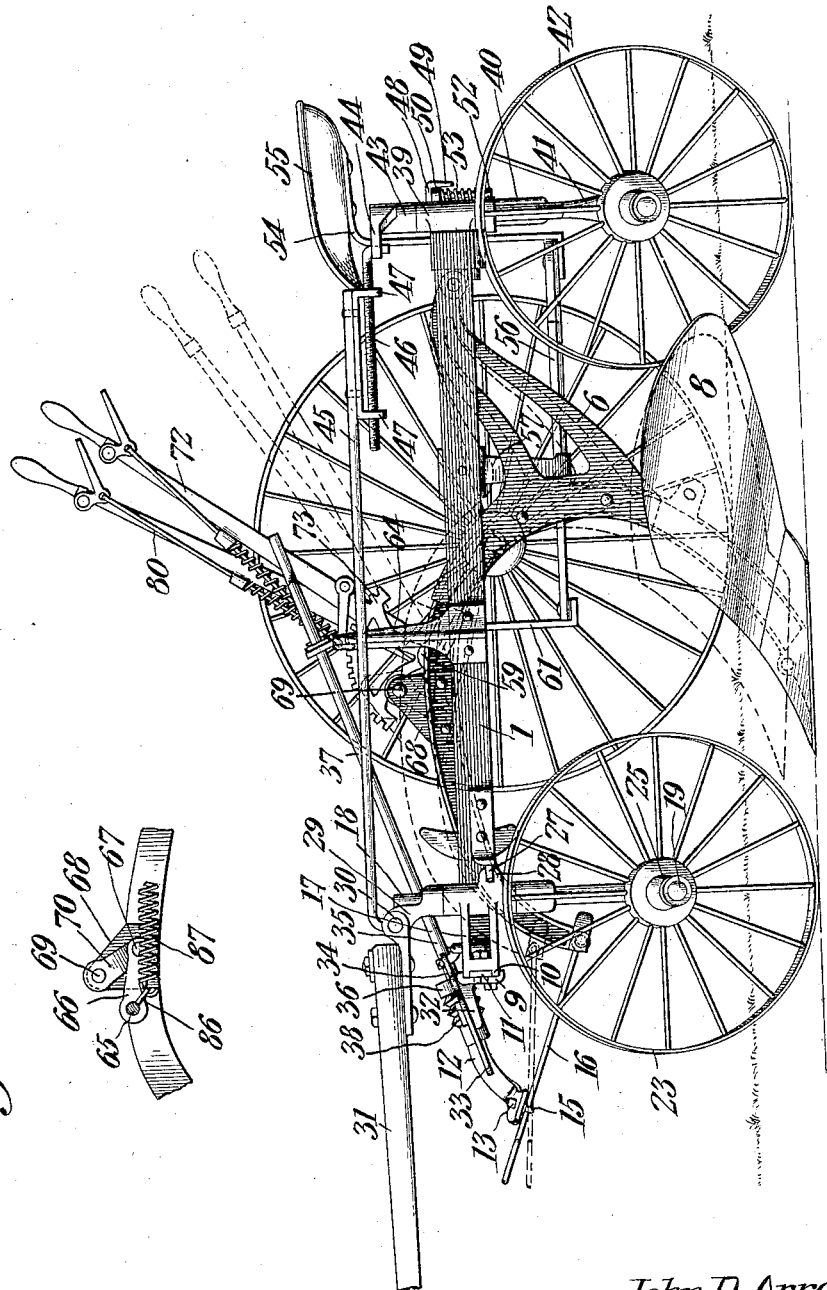

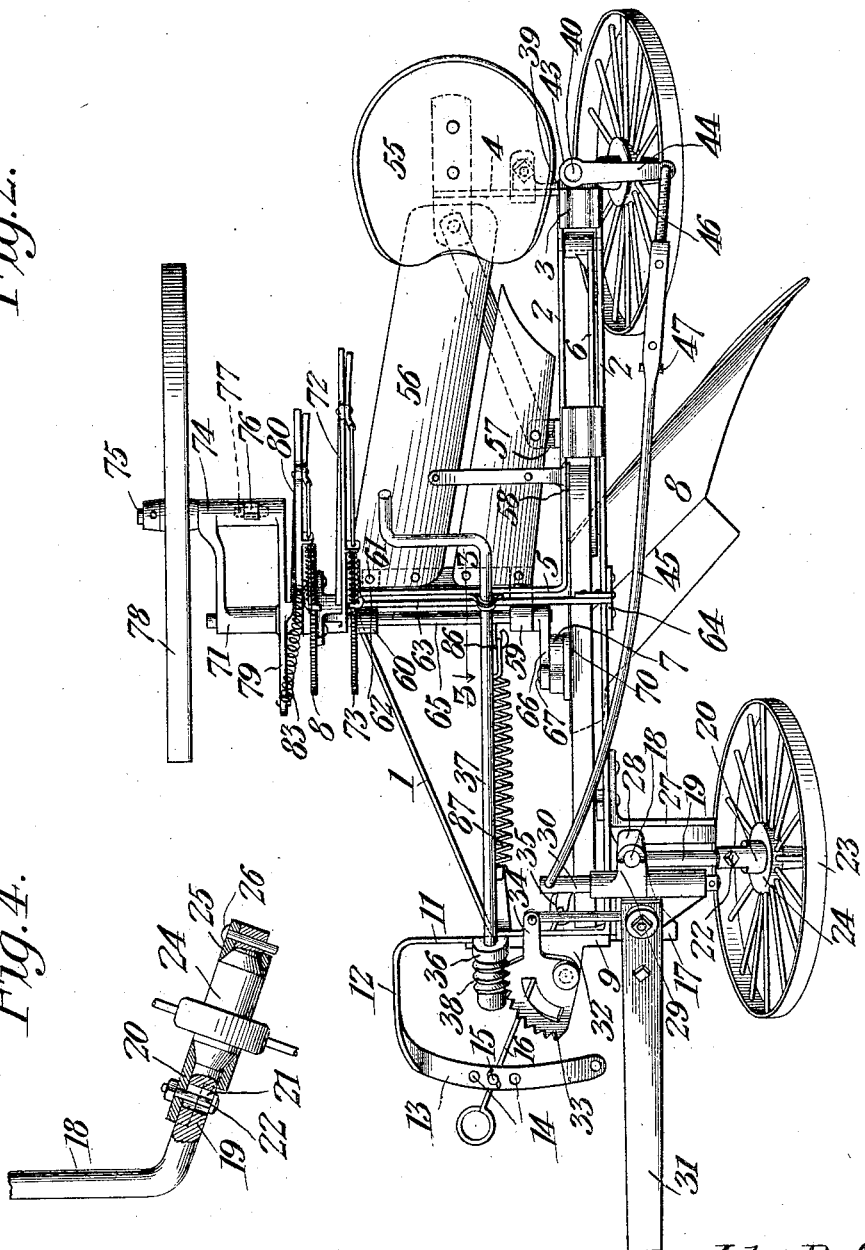

No. 878,033. PATENTED FEB. 4, 1908.
J. D. ARRAS.
BREAKING PLOW.
APPLICATION FILED JAN. 22, 1907.

3 SHEETS—SHEET 3.

WITNESSES:

John D. Arras
INVENTOR

By C. A. Snow & Co.
ATTORNEYS

UNITED STATES PATENT OFFICE.

JOHN D. ARRAS, OF RAWSON, OHIO.

BREAKING-PLOW.

No. 878,033.  Specification of Letters Patent.  Patented Feb. 4, 1908.

Application filed January 22, 1907. Serial No. 353,504.

To all whom it may concern:

Be it known that I, JOHN D. ARRAS, a citizen of the United States, residing at Rawson, in the county of Hancock and State of Ohio, have invented a new and useful Breaking-Plow, of which the following is a specification.

This invention has relation to breaking plows of the riding or sulky type and it consists in the novel construction and arrangement of its parts as hereinafter shown and described.

The object of the invention is to provide an implement of the nature indicated with a light frame of peculiar configuration and having its parts so disposed as to be braced against strain and vibration. The plow beam is pivotally attached to said frame and means is provided for raising and lowering the said beam. The beam, however, is retained against lateral movement with relation to the frame. The frame is supported by wheels, one of which travels upon the unbroken land and the remaining two travel in the furrows, one in advance and the other behind the plow share. The said furrow wheels are inclined so that they bear against the land sides of the furrows. Means is provided for taking up the wear in the hubs of the said wheels so that they will not wabble and cause the implement to move and operate unsteadily. Means is provided for manually shifting the forward end of the frame laterally with relation to the forward furrow wheel whereby the plow share is also laterally shifted with relation to the said furrow wheel and consequently, while the implement is moving the said share may be shifted to make a broad or narrow cut and consequently the alinement of the furrows may be properly preserved as the implement is passed through thick or thin, heavy or light soil. A draft rod is attached to the forward end of the beam and is guided through an eye carried by an extension of the forward furrow wheel. Consequently, the draft from the draft animals is always applied to the forward furrow wheel at the same point and the pull is exerted directly upon the front end of the plow beam. The said beam is of peculiar configuration in order to occupy but little space and is confined at all times between the vertical sides of the frame. The forward end of the beam is downwardly curved and moves vertically as the beam is raised and lowered and consequently the draft rod is not materially moved longitudinally through its guiding eye as the plow is raised and lowered. Means is also provided for raising and lowering the right hand side of the plow frame without raising or lowering the beam with relation to the frame.

The front and rear furrow wheels are journaled upon spindles which in turn have vertically extending portions journaled in bearing and at their upper ends lateral extensions. The longitudinally adjustable rod is pivoted at its ends to said extensions whereby the said furrow wheels are caused to turn laterally simultaneously which facilitates the turning of the implement around sharp corners. The rear furrow wheel is also provided with a shock absorber which permits the wheel to swing laterally when the share strikes a root or other obstruction and thus relieves the implement of jar and strain. The land wheel is journaled upon a spindle carried by a bracket which in turn is journaled upon the shaft extending transversely of the frame and which is operatively connected with the plow beam. Means is provided for swinging said bracket independently of said shaft. Means is also provided for swinging said bracket positively with the shaft also means is provided where the said bracket may at all times have a limited swing with relation to the shaft in case the ground wheel meets an obstruction and thereby affords means for permitting the said ground wheel to ride over such obstruction without elevating the frame of the implement unnecessarily. An operator's seat is supported by the frame of the implement as is also a platform upon which the operator may stand and from which he may readily descend or upon which he may readily step while the implement is in operation.

The implement is provided with such adjustments and means for manipulating its various parts that it may be used to advantage in fields wherein the heft of the soil varies in different portions. The parts may be adjusted to meet the different soil conditions while the implement is in operation. Also, the parts may be so adjusted that the implement will readily turn the final furrow which is usually very narrow, and for which reason is usually difficult to turn.

Figure 6:
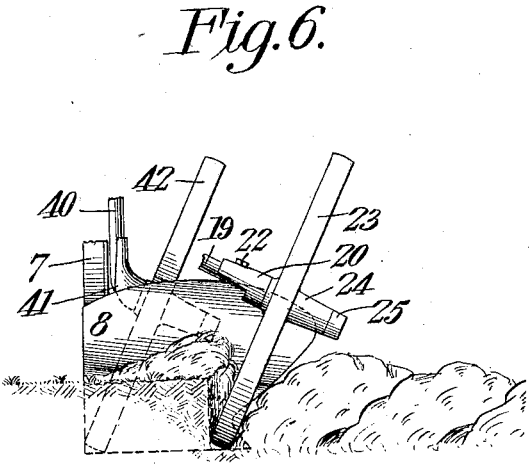
Figure 7:
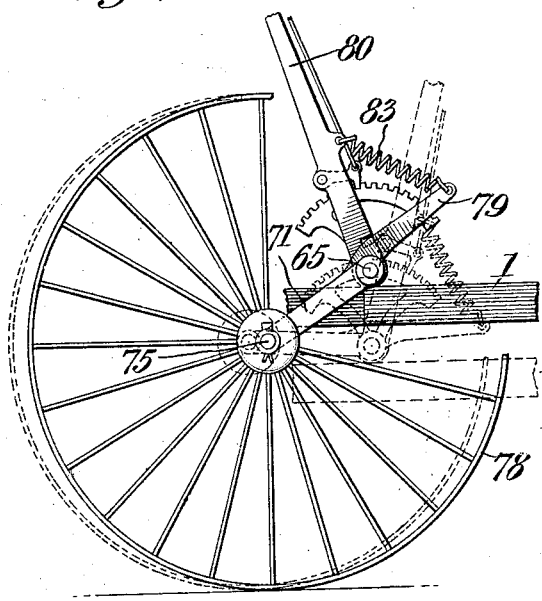
Figure 8:
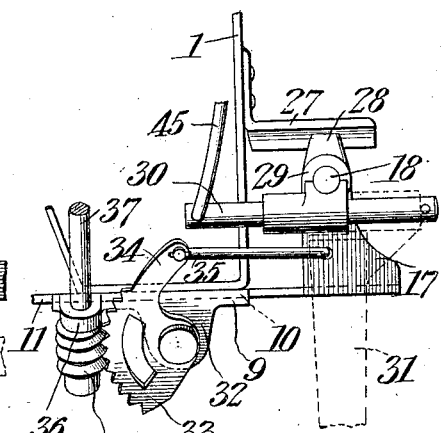

In the accompanying drawing:—Figure 1 is a side elevation of the plow. Fig. 2 is a top plan view of the same. Fig. 3 is a sectional view of the beam lifting shaft cut on the line 3—3 of Fig. 2. Fig. 4 is a side elevation of one of the furrow wheels showing the cup-shaped bearings in section. Fig. 5 is a rear elevation of the rear furrow wheel. Fig. 6 is a front elevation of the furrow wheel and plow share. Fig. 7 is a side elevation of the land wheel with parts broken away, and Fig. 8 is a top plan view of the forward portion of the frame of the plow.

The frame 1 is made 4-shaped and is horizontally disposed. The said frame is preferably constructed of a continuous strip of steel and at the stem of the figure which is generally outlined by the configuration of the frame the portions thereof are spaced apart in parallel relation as at 2, 2 and are secured together at their rear ends by a block 3. The inner portion 2 is provided at its rear end with a lateral extension 4 and at its forward end it merges with the lateral extension 5 which constitutes the lateral branch of the 4-form. A frame so constructed possesses maximum strength combined with minimum weight and the parts are braced against jarring and strain. The arm 6 is pivoted at its rear end between the rear portion of the parallel sections 2, 2 of the frame 1. The forward end of said arm is attached to the rear portion of the beam 7. Said beam is of peculiar configuration, it being substantially semi-ovate in side elevation with its forward end curved acuminate and downwardly disposed. The plow share 8 is fixed to the lower rear end of said beam 7. The beam 7 and the arm 6 lie within planes depending from the vertical sides of the frame 1. Consequently the implement is compact. The guide 9 is bolted or otherwise secured to the forward end of the frame 1 and is provided with a transversely disposed channel 10. The bar 11 is located in said channel 10 and is arranged to slide longitudinally thereof. Said bar is provided with a forwardly extending portion 12 at the end of which portion the said bar is twisted and continued into the laterally extending end portion 13 which is provided with a series of perforations 14. The shank of the eye 15 is adapted to pass through any one of the perforations 14 and is secured therein. The draft rod 16 passes through the eye 15 and is attached at its rear end to the downwardly disposed forward end of the beam 7. The other end of the bar 10 projects laterally beyond the side of the frame 1 and the bearing 17 is rigidly fixed to the last said end of the bar 10. The shaft 18 is journaled in said bearing 17 and its inner portion is vertically disposed while its outer lower portion is inclined and forms a spindle 19. The cup-shaped collar 20 is mounted upon the spindle 19 and may be adjusted longitudinally thereof by means of the elongated perforation 21 which receives the bolt 22 which in turn is screw-threaded in said spindle.

The furrow wheel 23 is provided with a hub 24, the ends of which are frusto-conical. One end of the said hub fits within the cup of the collar 20 while the cup-shaped cap 25 fits over the opposite end of the said hub and is held upon the spindle 19 by a linch pin 26 or other suitable securing device. By such construction it is obvious that as the hub of the wheel wears such wear may be taken up by moving the collar 20 longitudinally of the spindle 19. Also the bearing surface between the hub 24 and the said spindle is not confined to the exterior of the spindle and the interior of the hub as the conical ends of the hub will also bear against the corresponding interior surface of the collar and cap. Thus, the bearing surface is increased and the spindle is pitched at an angle and thrust bearing is provided which relieves the parts of undue wear and prevents wabbling of the wheel upon the spindle during rotation.

A wheel bearing as above described is also provided for the rear furrow wheel which is also pitched at an angle while the ground furrow wheel is provided with a bearing of slightly different construction but which may be adjusted to take up the wear in order that there may be no lateral play of the wheel upon the spindle. As the bearing of the last said wheel is not subjected to thrust it is not necessary to make provision for such friction. The construction of the bearing of the last said wheel will be explained hereinafter. The guiding lug 27 is attached to the forward portion of the frame 1 and projects laterally with relation thereto. The rear side of the bearing 17 is provided with the parallel flanges 28 which receive between them the edge of the lug 27 and are adapted to slide longitudinally of the said lug. The collar 29 is fixed to the shaft 18 above the bearing 17. Said collar is provided with a transversely disposed bar 30 to one end of which is pivoted the tongue 31. The guide 9 is provided with a forwardly extending lug 32 upon which is pivoted a gear segment 33. Said segment is provided at one end with an extension 34 which is connected by means of a link 35 with the bearing 17. The said guide 9 is also provided with a bearing 36 in which is journaled the lower portion of the shaft 37. The lower end of said shaft is provided with a worm gear 38 which meshes with the gear segment 33. The opposite end of the shaft 37 is fashioned into a crank handle which is located in the vicinity of the operator's seat as will hereinafter appear. The bearing 39 is pivoted to the rear end of the frame 1 and the shaft 40 is journaled in said bearing. The said shaft 40 merges at its lower end into the downwardly inclined spindle 41 upon which is journaled a furrow wheel 42 in a similar manner and of similar construction as the furrow wheel 23.

The collar 43 is fixed to the upper end of the shaft 40 and rests upon the upper end of the bearing 39. Said collar 43 is provided with a lateral extension 44. The rod 45 is pivoted at its forward end to the end of the bar 30 opposite to that end thereof to which the tongue 31 is attached. The rear end of said rod 45 is pivotally connected with the lateral extension 44 of the collar 43. Means is provided for lengthening or shortening the said rod 45 which consists in making the said rod in two sections, one of which is screw threaded as at 46 and passes through the threaded lugs 47 provided upon the other section. The said bearing 39 is pivoted to the rear end of the frame 1 and may have a limited lateral swing with relation thereto. The extension of the said frame 1 is provided with a rearwardly extending lug 48 the extreme end of which is downwardly disposed as at 49. The bearing 39 is provided with a lateral extension 50 at the upper corner of which is provided an eye 51. Said eye lies under the lug 48 and within the end 49 thereof. The bolt 52 is supported by the lug 48 and passes through the same and also through the eye 51. The coil spring 53 surrounds the said bolt 52 and is interposed between the head thereof and the lower surface of the eye 51. The tension of said spring is such as to have a tendency to maintain the upper surface of the eye 51 in contact with the lower surface of the lug 48 and when the plow share 8 strikes a root or other obstruction the said spring 53 will act as a shock absorber and permit the said share to move laterally and pass over such obstruction. This is accomplished by reason of the fact that the wheel 42 travels in the furrow behind the said share and the said wheel is pitched at an angle. Consequently when the share meets an obstruction the tension of the spring 53 is overcome and the wheel 42 for the moment assumes a vertical position which slightly raises the rear end of the frame 1. As the said wheel describes a slight arc in such movement the plow share 8 is carried in away from the obstruction as the wheel 2 is retained against lateral movement by the land side of the furrow. Thus the implement is relieved of jar and strain incident to the share meeting such obstruction. The seat post 54 is also attached to the lateral extension 4 of the frame 1 and upon the upper portion of the said post is attached the seat 55. The lower portion of the post 54 depends from the extension 4 and forms one of the supports for the platform 56. The hanger 57 depends from the shorter portion 2 of the frame 1 and also assists in supporting the said platform 56. The forward end of the said platform 56 is supported by depending extensions which will be hereinafter explained. The bearing plate 58 is attached to the edge of the platform 56 and lies opposite the rear portion of the beam 7 and is adapted to brace the said beam against lateral pressure due to the resistance of the soil.

The bearings 59 and 60 are attached to the lateral extension 5 of the frame 1. Each of the said bearings is provided with a depending hanger 61 which support the forward end of the platform 56 as above intimated. Each of the said bearings is also provided with vertical extensions 62. The upper ends of the said extensions are connected together by a cross bar 63 which also extends over the longer portion 2 of the frame 1 and is fixed at its end to a post 64 which is attached at its lower end to the said portion 2 of the frame 1. The post 64, vertical extensions 62 and the cross-bar 63 form a superstructure that braces the intermediate portions of the frame 1 and prevents the same from sagging at such portion. The shaft 65 is journaled in the bearings 59 and 60. Said shaft is provided at its inner end with a crank 66 which is provided with a laterally extending wrist pin 67. It has been hereinbefore stated that the beam 7 is of ovate configuration in side elevation. The beam however, does not form the outline of a complete oval but is interrupted and the obtund curve of the oval is virtually disposed between the portions 2 of the frame 1 and along the longer portion 2 of the said frame. The lug 68 is attached to the side of the beam 7 at a point substantially midway between the ends of the obtund curved portion of the said beam and it may be stated generally that said curve begins and ends in horizontal alinement with the frame 1 and the intermediate portion of the beam between the ends of the said curve projects above the said frame. The lug 68 is provided with a laterally extending wrist pin 69 and the link 70 is provided with perforations which receive the wrist pins 67 and 69.

From the foregoing description it is obvious that as the shaft 65 is partially rotated that the crank 66 will revolve and through the link 70 and lug 68 will raise or lower the beam 7. The lug 68 is so located upon the said beam that the forward acuminate curve and downwardly disposed end thereof will be raised or lowered substantially vertically, while the plow share 8 will be raised or lowered and at the same time given a rocking movement so that its point may be the first part to enter the soil and the said point is also the first part to leave the soil when the share is elevated. Consequently, the rear portion or sweep of the share, for a brief space of time remains lowered while the point is elevated consequently the furrow is completely turned at the time that the share in its entirety leaves the same. The ratchet lever 72 is fixed to the shaft 65 and its pawl is adapted to engage the gear segment 73 which is attached to the bearing 60. The bracket 71 is journaled upon the shaft 65. The lower end of the said bracket is provided with a sleeve 74 which receives a spindle 75. Said spindle 75 may be adjusted longitudinally of the sleeve 74 and secured in proper position therein by means of a bolt 76 which passes through a perforation in the said spindle 75 and an elongated opening 77 in the sleeve 74.

The ground wheel 78 is journaled upon the spindle 75 and is held thereon by means of a cap 79 attached to the end of the spindle. Thus, it is obvious that as the hub of the said wheel wears the said spindle 75 may be moved longitudinally to take up such wear and prevent the ground wheel 78 from having relative lateral movement or vibration. The bracket 73 is provided with a lug 79 which extends upon the opposite side of the journaled bearing of the bracket as the body thereof. A ratchet lever 80 is journaled upon the shaft 65 adjacent the said bracket 73 and is provided with a lug 81 which normally engages a lug 82 carried by the extension 79. The coil spring 83 is fixed at one end to the extreme end of the extension 79 and at its opposite end to the said ratchet lever 80. The tension of the said spring 83 is such as to have a tendency to hold the lugs 81 and 82 in contact with each other and in order that the bracket 73 may turn as the said lever 80 is moved. The lever 83 consequently, normally extends substantially at a right angle to the extension 79. A gear segment 84 is attached to the side of the lever 72 and is in position to be engaged by the pawl of the lever 80. It will thus be seen that by moving the lever 80 the ground wheel 78 may be raised or lowered and consequently the right side of the frame 1 is raised or lowered without raising or lowering the beam 7. And that by moving the lever 72 the lever 80 will move in unison therewith and consequently the right side of the frame will be raised or lowered simultaneously. The advantage of this adjustment is that the lever 80 may be used to move the wheel 78 to level the frame 1 sidewise in order that the share 8 may work in the soil at the desired depth and that by manipulating the lever 72 the share 8 may be lowered into or lifted out of the soil while the frame 1 is level. Thus the furrows may be completed with uniformity and without disturbing the soil previously turned.

The upper rear portion of the shaft 37 is journaled in a bearing 85 provided upon the cross bar 63 and the crank handle end of the said shaft 37 is located above the platform 56. In connection with the lateral adjustment for the forward end of the frame 1 with relation to the forward furrow wheel 22 which adjustment is accomplished by the operator manually by turning the shaft 37 such adjustment may be accomplished while the implement is moving in order to regulate the breadth of the furrow being turned that the furrow may be kept straight and that the share may be moved to meet soil conditions. Also at the final furrow which is usually narrower than the furrows previously turned the furrow wheel 23 is brought against the land side of the said furrow then the shaft 37 is rotated so that the plow share 8 is carried beyond the opposite side of the furrow or beyond the opposite land side of the furrow. The shaft 37 is then turned in the opposite direction in order to bring the share 8 properly across the said furrow. At such time it is understood that the ground wheel 78 and the rear furrow wheel 42 are traveling upon loose soil, consequently they can perform but slight function in keeping the implement in proper alinement and this can only be done by so moving the share 8 laterally with relation to the furrow that the resistance to the soil may be centered upon the share and the implement kept in alinement by the comparatively slight contact of the front furrow wheel 23 against the land side of the furrow. The lateral adjustment of the said share permits of this advantageous manipulation and the said share may be moved laterally as the implement is traveling and thus the field may be completely tilled with uniformity and regularity without requiring the operator to leave the seat for adjusting parts to meet conditions as the work progresses.

The function of the spring 83 connecting the extension 79 with the lever 80 is that in case the ground wheel 78 should meet an obstruction upon the surface of the ground the tension of the said spring will be overcome and the said wheel will move rearwardly and upwardly and ride over such obstruction without elevating the frame of the implement to excess and consequently varying the depth of cut of the share. The platform 56 is so located upon the frame 1 as to brace the lateral extensions thereof; also, the said platform affords means for the operator to stand upon the implement and look over the heads of the draft-animals to maintain the alinement of the furrow being cut. One side of the platform is free of obstruction and the operator may alight from the same without interference while the implement is traveling and may also step upon the implement while it is moving. The shaft 65 is provided with a downwardly extending pin 86 to the end of which is fixed the rear end of the coil spring 87. The forward end of said spring is attached to the forward end of the frame 1. The tension of the said spring is such as to have a tendency to maintain that end of the pin 86 to which it is attached disposed toward the front end of the frame 1. Consequently, when the share 8 is lowered into the ground the tension of the said spring 87 is increased but in raising the shaft from the ground the increased tension of the said spring comes into play and assists the operator in overcoming the weight of the beam 7 and its attachment.

Having described my invention what I claim as new and desire to secure by Letters Patent is:—

1. In a plow, a frame a plow beam attached thereto, a guide mounted upon the frame, a bar slidably engaging said guide, a bearing carried by the bar, a shaft journaled in the bearing, a furrow wheel journaled upon the shaft, a gear segment pivoted upon the guide, a link connecting said segment with said bearing and a shaft and worm gear engaging said gear segment.

2. In a plow, a frame a beam attached thereto, a shaft vertically journaled thereto and having a downwardly inclined portion which forms a spindle, a collar having a cup-shaped end located upon said spindle and being capable of adjustment longitudinally thereof, a wheel having a hub provided at its ends with frusto-conical extensions, one of which enters the cup-shaped end of said collar and a cap having a frusto-conical recess which receives the opposite end of the wheel hub.

3. In a plow, a frame, a beam pivoted thereto, a platform carried by the frame, a bearing-plate attached to said platform and lying opposite the rear portion of the beam.

4. In a plow, a frame, a beam pivoted to the frame, a shaft journaled upon the frame, a crank carried by said shaft, a link pivotally connecting the crank with the beam, a ratchet lever fixed to the shaft, a bracket journaled upon the shaft, a ground wheel journaled upon said bracket, a ratchet lever journaled upon the shaft, a spring connected at one end to the last said ratchet lever and at its opposite end to said bracket, a gear segment attached to the first said ratchet lever and lying in the path of the pawl of the last said ratchet lever.

5. In a plow, a frame, a beam pivotally supported thereby, a shaft journaled upon the frame, a crank attached to said shaft, a link connecting said crank with said beam, a spring connected at one end with said shaft and at its other end with said frame, a ratchet lever fixed to the said shaft, a gear segment attached to said ratchet lever, a ratchet lever journaled upon the shaft and carrying a pawl for engagement with said gear segment, a bracket journaled upon the shaft, a ground wheel journaled upon said bracket, and a spring connecting the last said lever with said bracket.

6. In a plow, a frame, an arm pivoted to the frame, a beam fixed to said arm, said beam being semi-ovate in side elevation with its obtund curved portion uppermost the forward portion of the beam being free and a means for raising and lowering the beam connected with the upper portion thereof substantially midway between the ends of the obtund curved portion thereof.

7. In a plow, a frame, an arm pivoted to the frame, a beam fixed to said arm, said beam being semi-ovate in side elevation and having an upper obtund curved portion, a lug attached to said beam at a point substantially midway between the ends of the obtund curved portion thereof, said lug having a wrist pin, a shaft journaled upon the frame, means for turning the shaft, a crank attached to said shaft and having a wrist pin and a link having perforations which receive said wrist pins.

In testimony that I claim the foregoing as my own, I have hereto affixed my signature in the presence of two witnesses.

JOHN D. ARRAS.

Witnesses:
JACOB BURKET,
E. W. BURKET.